US008229897B2

(12) United States Patent
Cannon et al.

(10) Patent No.: US 8,229,897 B2
(45) Date of Patent: Jul. 24, 2012

(54) RESTORING A FILE TO ITS PROPER STORAGE TIER IN AN INFORMATION LIFECYCLE MANAGEMENT ENVIRONMENT

(75) Inventors: David M. Cannon, Tucson, AZ (US);
Thomas K. Clark, Tucson, AZ (US);
Stephen F. Correl, Portland, OR (US);
Toby L. Marek, Santa Clara, CA (US);
James J. Seeger, Jr., Portland, OR (US);
David M. Wolf, Portland, OR (US);
Jason C. Young, Portland, OR (US);
Michael W. Young, Pittsburgh, PA (US)

(73) Assignee: International Business Machines Corporation, Armonk, NY (US)

( * ) Notice: Subject to any disclaimer, the term of this patent is extended or adjusted under 35 U.S.C. 154(b) by 896 days.

(21) Appl. No.: 11/347,515

(22) Filed: Feb. 3, 2006

(65) Prior Publication Data
US 2007/0185934 A1 Aug. 9, 2007

(51) Int. Cl.
*G06F 7/00* (2006.01)
*G06F 17/00* (2006.01)
*G06F 13/00* (2006.01)
*G06F 13/28* (2006.01)

(52) U.S. Cl. ........ 707/679; 707/644; 707/645; 707/646; 707/680; 707/681; 711/162

(58) Field of Classification Search .................. 707/644, 707/645, 646, 649, 680, 681; 711/162
See application file for complete search history.

(56) References Cited

U.S. PATENT DOCUMENTS

| 6,003,042 | A | 12/1999 | Melahn | 707/203 |
| 6,330,572 | B1 * | 12/2001 | Sitka | 707/205 |
| 6,714,952 | B2 * | 3/2004 | Dunham et al. | 707/204 |
| 7,103,740 | B1 * | 9/2006 | Colgrove et al. | 711/162 |
| 7,162,599 | B2 * | 1/2007 | Berkowitz et al. | 711/162 |
| 7,177,883 | B2 * | 2/2007 | Yagawa | 707/104.1 |
| 7,197,520 | B1 * | 3/2007 | Matthews et al. | 707/204 |
| 2001/0047461 | A1 * | 11/2001 | Milillo et al. | 711/162 |
| 2002/0112135 | A1 | 8/2002 | Playe | |
| 2002/0166026 | A1 | 11/2002 | Ulrich et al. | 711/114 |

(Continued)

FOREIGN PATENT DOCUMENTS
WO    WO00/04483 A2    1/2000

OTHER PUBLICATIONS

Sun Microsystems, Information Lifecycle Management—A Business Brief, Jan. 2005, pp. 1-11.*

(Continued)

*Primary Examiner* — John Breene
*Assistant Examiner* — Huen Wong
(74) *Attorney, Agent, or Firm* — Walter W. Duft

(57) ABSTRACT

A technique for implementing policy-aware backup and restore capability in a tiered storage system. If a data set's contents are backed up from the tiered storage system to a backup storage system, metadata for the data set may also be backed up. Prior to the data set being restored from the backup storage system to the tiered storage system, the backed up metadata is restored and processed to determine a tier among the tiered storage pools to which the data set will be restored.

19 Claims, 7 Drawing Sheets

U.S. PATENT DOCUMENTS

| | | | |
|---|---|---|---|
| 2003/0046270 A1* | 3/2003 | Leung et al. | 707/1 |
| 2003/0058277 A1 | 3/2003 | Bowman-Amuah | 715/765 |
| 2004/0148308 A1 | 7/2004 | Rajan et al. | 707/102 |
| 2005/0021566 A1* | 1/2005 | Mu | 707/200 |
| 2005/0028025 A1 | 2/2005 | Zalewski et al. | 714/6 |
| 2005/0033757 A1* | 2/2005 | Greenblatt et al. | 707/100 |
| 2005/0071390 A1* | 3/2005 | Midgley et al. | 707/204 |
| 2005/0086445 A1 | 4/2005 | Mizuno et al. | 711/162 |
| 2005/0160243 A1 | 7/2005 | Lubbers et al. | 711/162 |
| 2006/0149889 A1* | 7/2006 | Sikha | 711/100 |
| 2006/0248038 A1* | 11/2006 | Kaplan et al. | 707/1 |

OTHER PUBLICATIONS

Sun Microsystems, Information Lifecycle Management Maturity Model, Apr. 2005, pp. 1-8.*
WIPO, "International Preliminary Report on Patentability," PCT/EP2007/050080, Aug. 5, 2008, 9 pages.
WIPO, "International Searching Authority Written Opinion," PCT/EP2007/050080, Oct. 24, 2007, 8 pages.
WIPO, "International Search Report," PCT/EP2007/050080, Oct. 24, 2007, 4 pages.

* cited by examiner

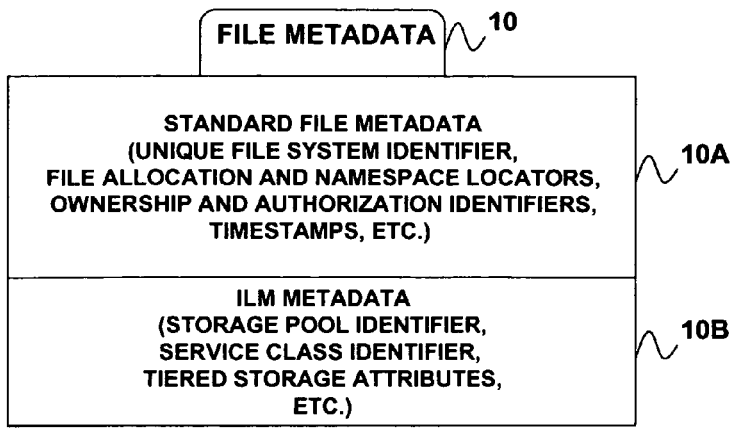
*FIG. 2*
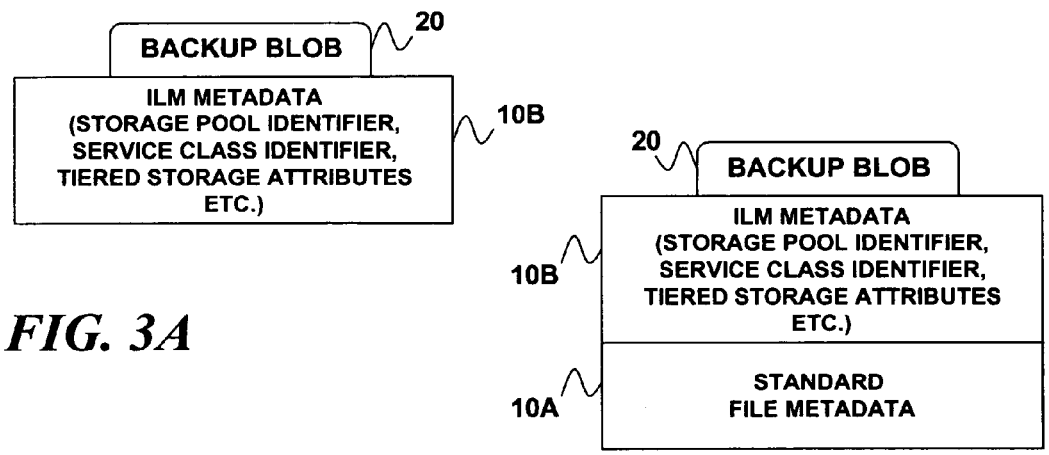
*FIG. 3A*
*FIG. 3B*
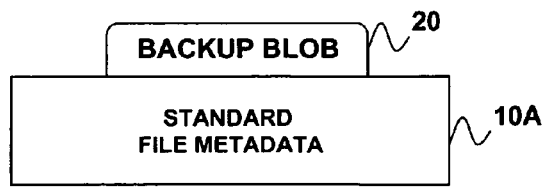
*FIG. 3C*

RESTORING A FILE TO ITS PROPER STORAGE TIER IN AN INFORMATION LIFECYCLE MANAGEMENT ENVIRONMENT

BACKGROUND OF THE INVENTION

1. Field of the Invention

The present invention relates to data storage. More particularly, the invention is directed to tiered data storage environments in which data storage devices are arranged in a tiered hierarchy and data is stored therein according to policy-aware data placement algorithms. Still more particularly, the invention is concerned with the protection of tiered storage data using improved file backup and restore techniques.

2. Description of the Prior Art

By way of background, the cost of data storage may vary considerably according to the nature and capabilities of the underlying data storage device(s). Exemplary storage cost determinants include the basic storage technology employed (e.g., disk or tape), and device operational characteristics such as access speed, transfer rate, data redundancy, fault tolerance, etc. In a tiered storage system, a collection of storage devices is divided into hierarchically defined storage tiers based on relative device cost (and associated capabilities). This arrangement allows a data owner to leverage its total data storage investment by placing lower value data on less-costly, lower tier storage devices, and reserving high cost, upper tier storage devices for higher value data.

Information Lifecycle Management (ILM) involves the assessment of data "value" and the corresponding assignment of such data to tiered storage. Using policy-based data placement algorithms that classify data according to defined parameters, and which take into account differentiating factors such as access speed requirements, anticipated access frequency, anticipated concurrency level, etc., a data set (e.g., a file, a set of files, a directory, a logical volume, etc.) can be assigned to the storage tier that reflects the best utilization of data storage resources. ILM also contemplates that a data set created in one storage tier may need to be moved to other storage tiers during its lifetime according to changes in the data set's perceived value.

In order to provide application transparency relative to the tiered storage system and its underlying ILM transactions, there is typically a single file system that provides a global namespace for all of the data stored in the various tiers. Applications can thus access their data in conventional fashion (e.g., via file and pathname lookups) without having to be aware of how the data is assigned to particular storage devices within the file system. An application's accessibility to its data will likewise be unaffected by the movement of data between tiers.

A present disadvantage of ILM and policy-based data placement within the context of a single file system is the difficulty of implementing traditional data backup/restore protection. Consider, for example, a data backup/restore sequence in which data maintained by the tiered storage file system is periodically copied to a backup file system on a backup storage resource, and then subsequently restored to the original file system. A conventional backup/restore product will backup a data file's contents and its standard file metadata (e.g., ownership and authorization identifiers, timestamps, etc.) to the backup storage. However, conventional backup/restore products have little or no understanding of the kind of extended ILM metadata that may be used by the tiered storage file system to maintain a file in an ILM environment (e.g., storage tier identifiers, service class identifiers, etc.). Nor is such information readily available through conventional file system interfaces. As a result, the subsequent restore operation cannot guarantee that a file's contents will be placed in the policy-determined storage tier. In all likelihood, the file will not be placed in the correct storage tier during the restore operation. The result will be sub-optimum storage utilization and application performance. Storage tiers may also fill prematurely, which can cause application outages. Application outage time is often very expensive to an enterprise.

Although it may be possible to implement policy placement rules that assign data based on standard file metadata, it is not practical to use the metadata of a backed up file during a conventional restore operation. This is because the full set of a file's standard attributes is typically not communicated to the target file system until after the contents of the file have been restored. Restoring the metadata before the file data has been restored would render the file accessible but incomplete, and any attempt by an application to access the file could lead to serious application errors.

A typical procedure for restoring a file previously backed up to tape (assuming the file systems are POSIX-compliant) would involve the following steps using conventional file system calls in the tiered storage file system:

1) Restore application issues open( ) call to the tiered storage file system using the O_CREATE flag to create the file to be restored (the restore file);
2) Restore application copies data blocks from backup file buffers to restore file buffers;
3) Restore application sets owner, group, timestamps and permissions for the restore file from the backed up metadata; and
4) Restore application issues close( ) call to the tiered storage file system to close the restore file.

In this example, the restored file can easily be evaluated to the wrong storage tier. This happens because the allocation decision needs to be made before the first file block is written, not after the data is written. Here, the allocation information (i.e., the backed up file metadata) is not known to the target file system until the end of the restore operation.

It is to improvements in the backup and restoration of files in a tiered data storage environment that the present invention is directed. In particular, what is needed is a technique for handling extended file metadata during backup and restore operations and for correctly identifying a file's proper tiered location whenever the file is restored from a backup storage file system to the tiered storage file system.

SUMMARY OF THE INVENTION

The foregoing problems are solved and an advance in the art is obtained by a novel technique for implementing policy-aware backup and restore capability in a tiered storage system. If a data set's contents are backed up from the tiered storage system to a backup storage system, metadata for the data set may also be backed up. Prior to the data set being restored from the backup storage system to the tiered storage system, the backed up metadata is restored and processed to determine a tier in the tiered storage system to which the data set will be restored.

In exemplary embodiments of the invention, the metadata comprises Information Lifecycle Management (ILM) metadata, standard file metadata, or a combination of both. The metadata backup operation comprises providing the metadata from a file system on the tiered storage system to a backup application, and storing the metadata in persistent storage outside of the tiered storage system. A file system call provided by the tiered storage file system allows the backup application to initiate the metadata backup operation. The tiered storage file system responds to the call by providing the metadata to the backup application for storage in the persistent storage. The metadata may be stored by the backup application as an opaque binary object or in any other suitable format.

In further exemplary embodiments of the invention, the metadata processing operation comprises restoring the metadata from persistent storage outside of the tiered storage system to the tiered storage file system in advance of the file system opening a data file associated with the metadata in the tiered storage system. A file system call provided by the tiered storage file system allows a restore application to initiate the metadata transfer operation. The metadata processing operation may further comprise applying policy placement rules to the metadata to determine the proper storage tier for the data set.

BRIEF DESCRIPTION OF THE DRAWINGS

The foregoing and other features and advantages of the invention will be apparent from the following more particular description of exemplary embodiments of the invention, as illustrated in the accompanying Drawings, in which:

FIG. 2 is a diagrammatic representation of exemplary metadata maintained in the data storage environment of FIG. 1;

FIG. 3A is a diagrammatic representation of first exemplary backup metadata maintained in the data storage environment of FIG. 1;

FIG. 3B is a diagrammatic representation of second exemplary backup metadata maintained in the data storage environment of FIG. 1;

FIG. 3C is a diagrammatic representation of third exemplary backup metadata maintained in the data storage environment of FIG. 1;

DETAILED DESCRIPTION OF EXEMPLARY EMBODIMENTS

Figure 1:
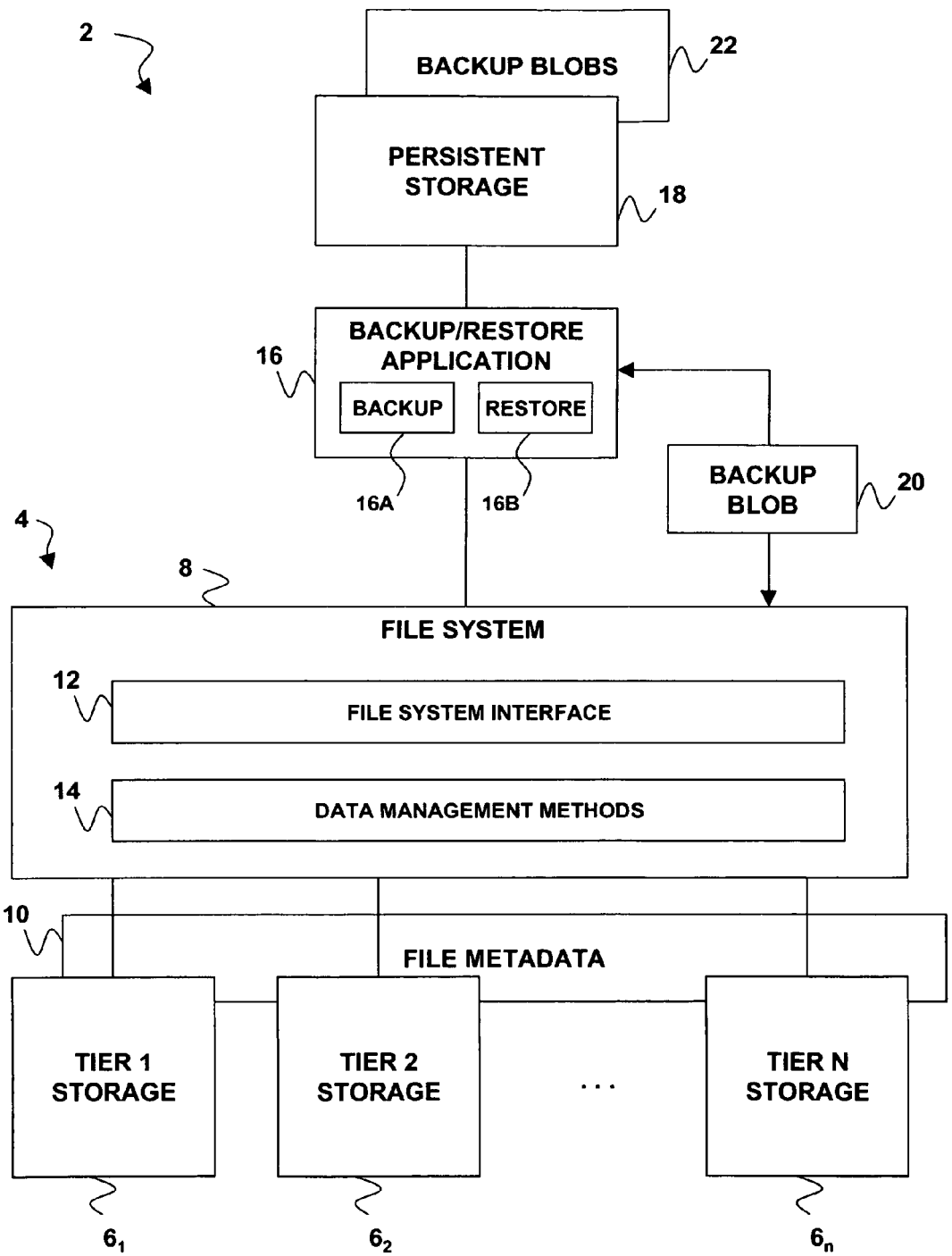
FIG. 1 is a functional block diagram showing an exemplary data storage environment in accordance with the present invention.

Turning now to the Drawing figures wherein like reference numerals indicate like components in all of the several views, FIG. 1 illustrates an exemplary data storage environment 2 in which a tiered data storage system 4 comprises 1 through n storage tiers $6_1$-$6_n$, where "n" is arbitrary and selected according to data storage requirements. As described by way of background above, the storage tiers $6_1$-$6_n$ can represent different classes of storage to which data sets are assigned according to ILM policy placement algorithms. Any number of different types of physical storage may be used to implement the storage tiers $6_1$-$6_n$. Examples include disk subsystems, RAID arrays, JBOD storage, tape libraries, optical libraries, to name but a few. It will be appreciated that each storage tier $6_1$-$6_n$ could be implemented using a single storage device or as a pool comprising any desired number of storage devices. By way of example only, the storage tier $6_1$ might comprise a pool of fast enterprise class RAID storage whose data needs to be replicated to a disaster recovery data center, the storage tier $6_2$ might be a pool of less reliable SATA storage for data having different backup requirements, and the storage tier $6_n$ might be a pool of very fast solid-state storage for temporary files that are not backed up at all.

Each storage tier $6_1$-$6_n$ may have an associated storage cost according to its underlying storage type (e.g., disk or tape) and operational capabilities. The ILM policy rules may be designed to place lower value data on less-costly, lower tier storage devices, and reserve high cost, upper tier storage devices for higher value data. The ILM policy rules may also periodically move data sets between the storage tiers $6_1$-$6_n$ to accommodate changing conditions. Note that the particulars of the ILM policies implemented in the data storage environment 2 are not pertinent to the present invention.

The storage system 4 is managed by a tiered storage file system 8 that provides a global namespace for data sets (e.g., files) maintained on the storage tiers $6_1$-$6_n$. In the file system 8, each file will have a global identifier (e.g., file and pathname) that is unique relative to other files in the storage system 4. This allows applications to utilize the storage system 4 as if it were a local storage device running a local file system. The applications need not be concerned with where the files are actually stored within the storage system 4.

The job of tracking file location is performed by the file system 8, which maintains ILM metadata information for all files of the storage system 4 in persistent storage. In most cases, this persistent storage will be provided within the storage system 4 itself, although it would also be possible to use separate storage. Insofar as it is common practice to store standard file metadata in association with each file maintained by a file system on a storage device, a logical place to persist the ILM metadata information used by the file system 8 would be with each data set's standard file metadata. In FIG. 1, the file metadata maintained by the file system 8 is shown by reference numeral 10. The file metadata 10 is shown to be associated with all of the storage tiers $6_1$-$6_n$, thus signifying that the data sets maintained on each tier have associated metadata. However, it is not necessarily the case that each storage tier $6_1$-$6_n$ stores its own metadata. In some architectures, the metadata 10 could be maintained in dedicated storage. Other arrangements are also possible, such as maintaining redundant copies of the metadata 10 in some or all of the storage tiers.

Turning now to FIG. 2, the file metadata 10 is shown to include standard file metadata 10A and ILM metadata 10B. The standard file metadata 10A represents the type of information that would be conventionally maintained by a file system, such as the fields of a Unix inode as stored on a disk. This information includes a unique file system identifier within a file system (e.g., inode number), file allocation and namespace locators (e.g., file size, block numbers, etc.), ownership and authorization identifiers (e.g. owner/group names and permissions), and timestamps (e.g., create time, modify time, access time, etc.). The ILM metadata 10B may represent any information that identifies a file's storage tier assignment, or which can be processed by a policy rule to determine a storage tier assignment. An example of the former would be a storage pool identifier that directly specifies a file's assigned storage tier, and a file system instance identifier (file system ID) generated during installation or initialization of the file system that maintains the file. An example of the latter would be a service class identifier that can be used to assign a storage tier. Other information that could be stored in the ILM metadata 10B might be attribute information for the assigned storage tier. This information could be used to place a file in a comparable alternate storage tier in the event that the file's original storage tier is unavailable at restore time (see below).

Returning now to FIG. 1, the file system 8 is shown to implement a file system interface 12 and data management methods 14. The file system interface 12 may provide a set of Application Program Interface (API) calls, such as conventional open( ) and close( ) calls for opening and closing files, respectively. As will be described in more detail below, one way that the present invention can be implemented is to provide at least two new file system calls that supplement the normal compliment of calls that the file system 8 would conventionally provide. The data management methods represent routines implemented by the file system 8 to interact with the files maintained in the storage system 4 in response to invocation of the file system interface 12. Except as described in more detail below relative to the new file system calls disclosed herein, the data management methods 14 are conventional in nature.

FIG. 1 additionally shows a backup/restore application 16 whose primary functions are to (1) backup files of the storage system 4 (performed by backup application 16A), and (2) thereafter restore the backed up files as required (performed by restore application 16B). The backup/restore application 16 is a client of the file system 8 that uses the file system interface 12 to read and write storage pool files, and to periodically scan the file metadata 10. It will be appreciated that the backup/restore application 16 could run locally on the same data processing hardware as the file system 8, or it could execute remotely on separate data processing hardware while communicating with the file system via a network or other communication medium.

Policy-aware backup and restore functions in the data storage environment 2 are supported by a mechanism for exchanging metadata between the file system 8 and the backup/restore application 16. More particularly, when a file's contents are backed up from the tiered storage system 4 by the backup application 16A, metadata for the file is also backed up. If the metadata for the backed up file changes after the initial metadata backup (e.g., due to the file being moved within the storage system 4), the metadata can be updated during an incremental backup without having to perform a complete file backup. An incremental backup could be initiated by the file system (e.g., by reporting to the backup/restore application 16 when a file's metadata changes as a result of being moved to a different tier). Alternatively, an incremental backup could be initiated by the backup/restore application 16 as a result of periodically checking to see if its stored metadata is current.

If it becomes necessary to restore the file, the file's backed up metadata is first restored to the file system 8 by the restore application 16B and then processed by the file system 8 to determine the proper storage tier to which the file belongs. More particularly, the restored metadata assists the file system 8 to ascertain where the backing blocks for the specified file should be allocated. A file system allocation algorithm (one of the data management methods 14) will discover from the restored metadata the storage tier where the file was stored when it was backed up, and may also learn other information that facilitates an informed decision about where to place the file. The file can then be restored in the usual manner but with the guarantee that the restored data will be placed in the correct tier in the storage system 4.

An exemplary data format that can be used to support the metadata exchange between the file system 8 and the backup/restore application 16 is an opaque BLOB (Binary Large OBject) 20. As persons skilled in the art will appreciate, an opaque BLOB is an unformatted collection of binary data. This format is convenient because no data structures are required (relative to the backup/restore application 16) and less memory overhead is needed to manage the data. To the backup/restore application 16 the BLOB 20 can be opaque (unstructured and without meaning) because the information therein is simply stored but not used by the backup/restore application. On the other hand, to the file system 8 the BLOB 20 is structured and intelligible because the file system is aware of the information therein and uses it to restore files to their proper storage tier. FIG. 1 illustrates a backup BLOB 20 being exchanged between the file system 8 and the backup/restore application 16. FIG. 1 also shows that a set 22 of the backup BLOBs 20 is maintained by the backup/restore application 16 in persistent storage 18. Note that the persistent storage 18 could be the same storage used for maintaining backed up files, or it could be separate storage. The persistent storage 18 could also be located within the storage system 4, but will typically be separate therefrom to provide fault tolerance.

As shown in FIGS. 3A, 3B and 3C, the backup BLOB 20 for a file can contain some or all of the file metadata 10 maintained in the storage system 4. In FIG. 3A, the backup BLOB 20 contains only ILM metadata 10B. In FIG. 3B, the backup BLOB 20 contains ILM metadata 10B and standard file metadata 10A. In FIG. 3C, the backup BLOB 20 contains only standard file metadata 10A. Other types of metadata could potentially also be used.

Figure 4:
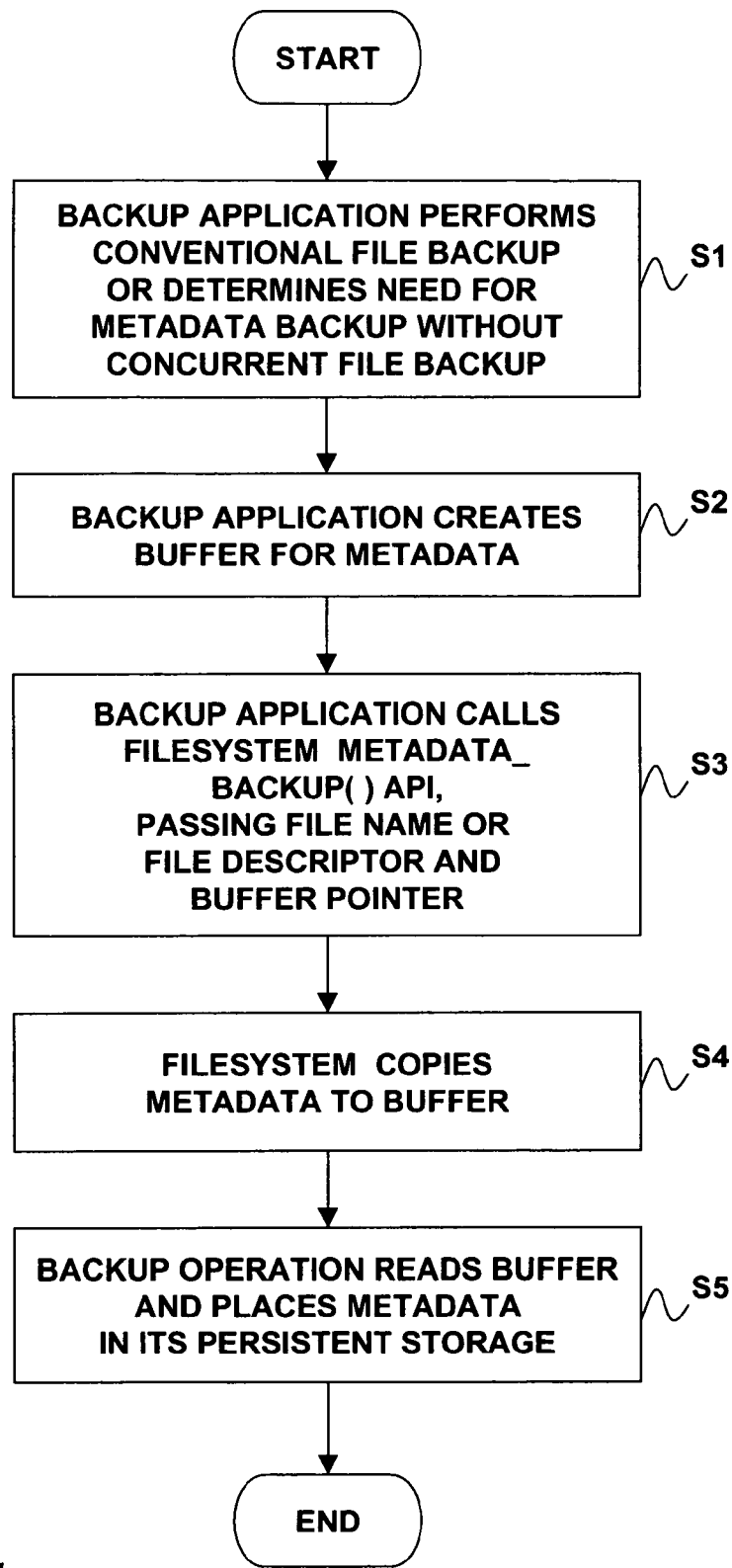
FIG. 4 is a flow diagram showing exemplary processing associated with a metadata backup operation.

Turning now to FIG. 4, an exemplary metadata backup operation may be performed by the file system 8 and the backup application 16A in accordance with the illustrated processing steps. This process utilizes a new file system call that can be invoked by the backup application 16A to obtain backup BLOBs 20 from the file system 8. Although the new file system call provides the convenience of a well-defined API mechanism, it should be understood that this backup technique is exemplary only. Other techniques could potentially also be used to backup metadata from the file system 8.

In step S1, the backup application 16A performs either a conventional backup operation to backup a data file, or it determines that a metadata backup is needed without a concurrent file backup. If a conventional file backup operation is performed, a backup of the file's metadata will usually be performed. If a conventional file backup is not performed, a metadata backup may still be required to reflect movement of the data file between storage tiers, a change in store tier attributes, or for other reasons. This can be performed as an incremental backup operation. The incremental backup operation could be initiated by the tiered storage file system 8 whenever appropriate, such as when a file's metadata changes as a result of the file being moved from one storage tier to another. One way that the file system 8 could initiate the incremental backup would be to provide a list of changed data files to the backup/restore application 16 through an appropriate interface. Other techniques could potentially also be used by the file system 8 to initiate the incremental backup. The incremental backup operation could also be initiated by the backup/restore application 16. In particular, the backup application 16A may periodically request the file system 8 to provide BLOBs 20 for data files that have been previously backed up, and then compare the newly provided BLOBS against the corresponding BLOBS that are in the backup BLOB set 22 maintained in the persistent storage 18. All BLOBs 20 that have changed in the BLOB set 22 can be replaced with their newer counterparts. The periodic BLOB requests issued by the backup application 16A may be issued using the metadata_backup( ) file system call described below. Thus, using incremental backups, any metadata that has changed in the file system 8 will be a candidate for incremental backup by the backup application 16A to the persistent storage 18.

In step S2, the backup application 16A creates a memory buffer with an associated pointer to a memory location that is accessible to the file system 8. The memory buffer should be large enough so that the file system 8 can pass a backup BLOB 20 to the backup application 16A containing the metadata to be backed up. In step S3, the backup application 16A issues a file system call that may be referred to as metadata_backup( ). The parameters of this call may include a file name (with associated namespace path) or an open file descriptor for the file whose metadata is to be backed up, a pointer to the memory buffer, and buffer size indicator.

A exemplary C-code version of the metadata_backup( ) call using a file name parameter might take the following form:

```
int metadata_backup(char *filename,
    void *metadataP,
    int *metadataSizeP);
```

A exemplary C-code version of the metadata_backup( ) call using a file descriptor parameter might take the following form:

```
int metadata_backup(int fd,
    void *metadataP,
    int *metadataSizeP);
```

In both of the above examples, the "int" return value could be standard error value (e.g., a POSIX "errno" value) indicating success or failure of the function call.

In step S4, the file system 8 copies the metadata for the identified filename or file descriptor as a backup BLOB 20 from the metadata 10 to the buffer identified in the function call. In step S5, the backup application 16A reads the metadata from the buffer and copies it to the persistent storage 18. This completes the metadata backup operation.

Figure 5:
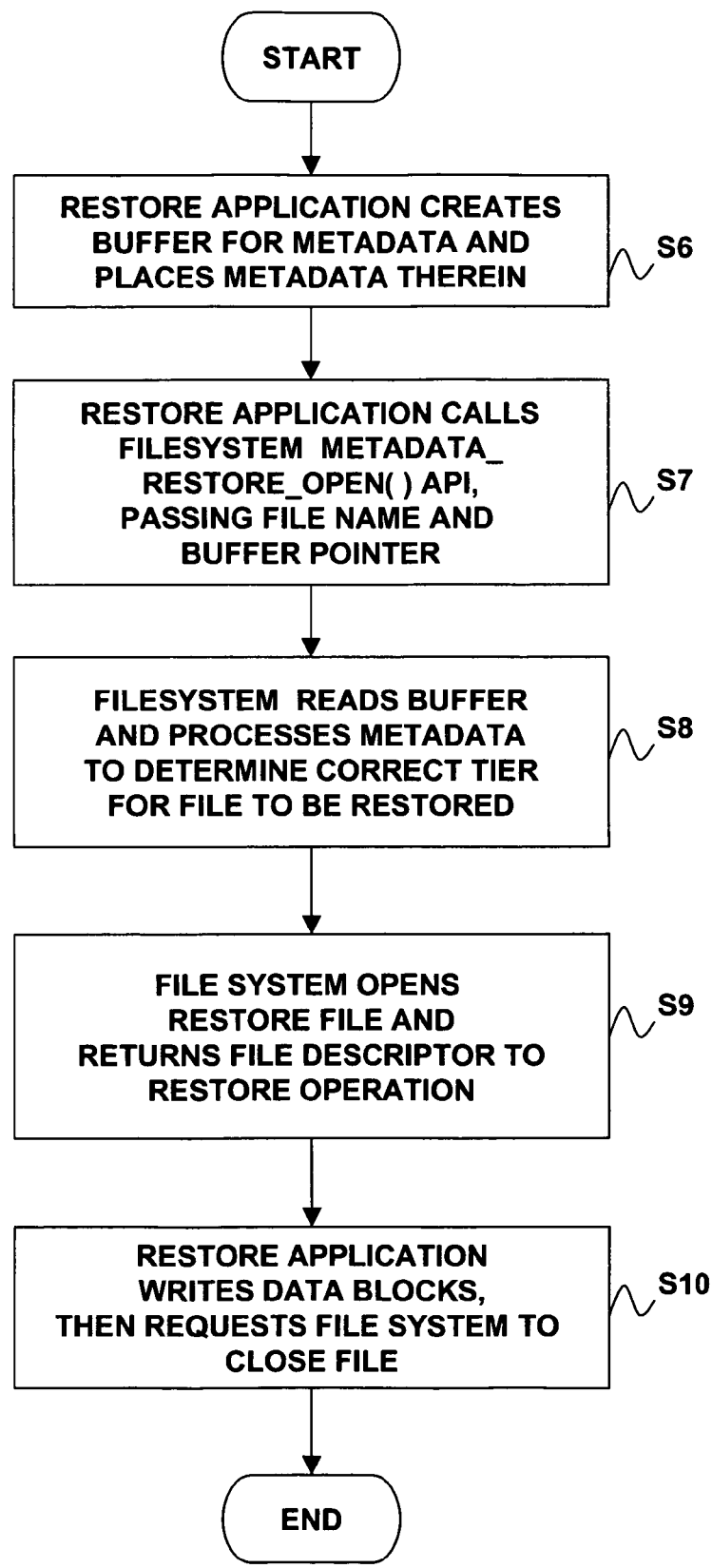
FIG. 5 is a flow diagram showing exemplary processing associated with a metadata restore operation.

Turning now to FIG. 5, when it is desired to restore a data file from backup storage to the file system 8, an exemplary metadata restore operation may be performed by the file system 8 and the restore application 16B in accordance with the illustrated processing steps. This processing utilizes a new file system call that can be invoked by the restore application 16B to restore the file's backup BLOB 20 from the persistent storage 18 to the file system 8, followed by the file system opening the file being restored in the correct storage tier using the information contained in the BLOB. Although the new file system call provides the convenience of a well-defined API mechanism, it should be understood that this backup technique is exemplary only. Other techniques could potentially also be used to restore a file and its metadata to the file system 8.

In step S6, the restore application 16B creates a memory buffer with an associated pointer to a memory location that is accessible to the file system 8. The memory buffer should be large enough so that the restore application 16B can pass a backup BLOB 20 to the file system 8 containing the metadata for the data file to be restored. After the memory buffer is created, the restore application 16B places the desired backup BLOB 20 therein. In step S7, the restore application 16B issues a file system call that may be referred to as metadata_restore_open( ). The parameters of this call may include a file name for the file being restored to be restored, a pointer to the memory buffer, and a buffer size indicator. If the POSIX open( ) call format is followed, the metadata_restore_open( ) call could also include standard mode and flags parameters.

A exemplary C-code version of the metadata_restore_open( ) call might take the following form:

```
int metadata_restore_open(char *filename,
    int flags,
    int mode,
    void *metadataP,
    int *metadataSizeP);
```

In the above example, the "int" return value could be standard error value (e.g., a POSIX "errno" value) indicating success or failure of the function call.

In step S8, the file system 8 reads the buffer to acquire the backup BLOB 20 containing the metadata for the identified filename. This restores the metadata to the file system 8 and enables the file system to examine the metadata to make the tier allocation decision 8. The file system 8 processes the restored metadata to determine the correct storage tier for the file to be restored. In step S9, the file system 8 opens and possibly creates a new restore file on the identified target storage tier and returns a file descriptor to the restore application 16B. In step S10, the restore application writes data blocks from the backed up file to the restore file and then closes the file. This completes the restore operation.

Figure 6:
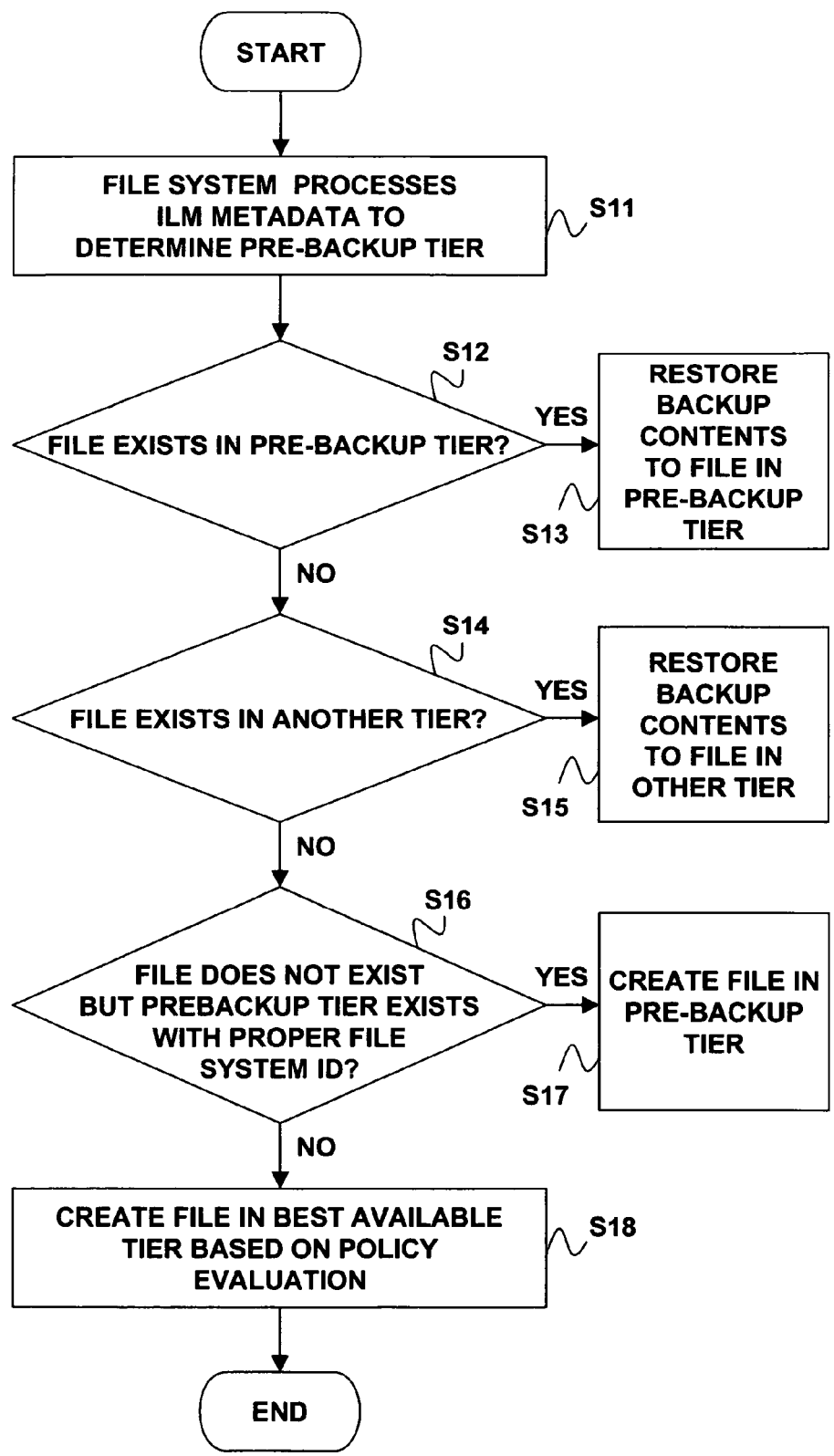
FIG. 6 is a flow diagram showing exemplary processing associated with metadata processing in support of a file restore operation.

Turning now to FIG. 6, exemplary logic is shown that may be implemented by the file system 8 to process restored metadata according to step S8. Although the metadata processing behavior to be described can be programmed into the file system as part of data management methods 14, an enhancement would be to allow the behavior to be modified by administrative file system directives or restore application directives, thereby giving an administrator or operator some control over how these decisions are made. Beginning in step S11, the file system 8 initially identifies a candidate storage tier based on the restored metadata. In most cases, this will be the storage tier that the file was stored on when it was backed up (the pre-backup storage tier). In step S12, the file system 8 searches the pre-backup storage tier to determine whether a version of the restore file exists. If it does, the file system 8 opens the restore file in that tier in step S13. If it is determined in step S12 that a version of the restore file does not exist in the pre-backup storage tier, step S14 is implemented and the file system 8 searches other tiers to determine whether a version of the file exists. If it does, the file system 8 opens the restore file in that tier in step S15.

If it is determined in step S14 that a version of the restore file does not exist in another storage tier, meaning that the file cannot be found, step S16 is implemented to check available ILM resources to determine whether the prebackup storage tier exists. If it does, the file system 8 creates the restore file in that tier in step S17. The only exception would be if the file system ID of the original storage tier has changed and does not match the original local file system ID that existed when the file was backed up (and which may be stored in the file's backup BLOB 20). This means that the file is being moved into a different or new file system and its previous storage tier may no longer be applicable. In this situation, processing will proceed to step 18, as described below.

If it is determined in step S16 that the prebackup tier does not exist (or exists with a different file system ID), step S18 is implemented. In this step, the file system 8 creates the restore file in the most suitable storage tier available based on policy rule evaluation of the restored metadata. Again, any suitable set of policy rules could be implemented according to the tiered storage strategy that is in place.

Figure 7:
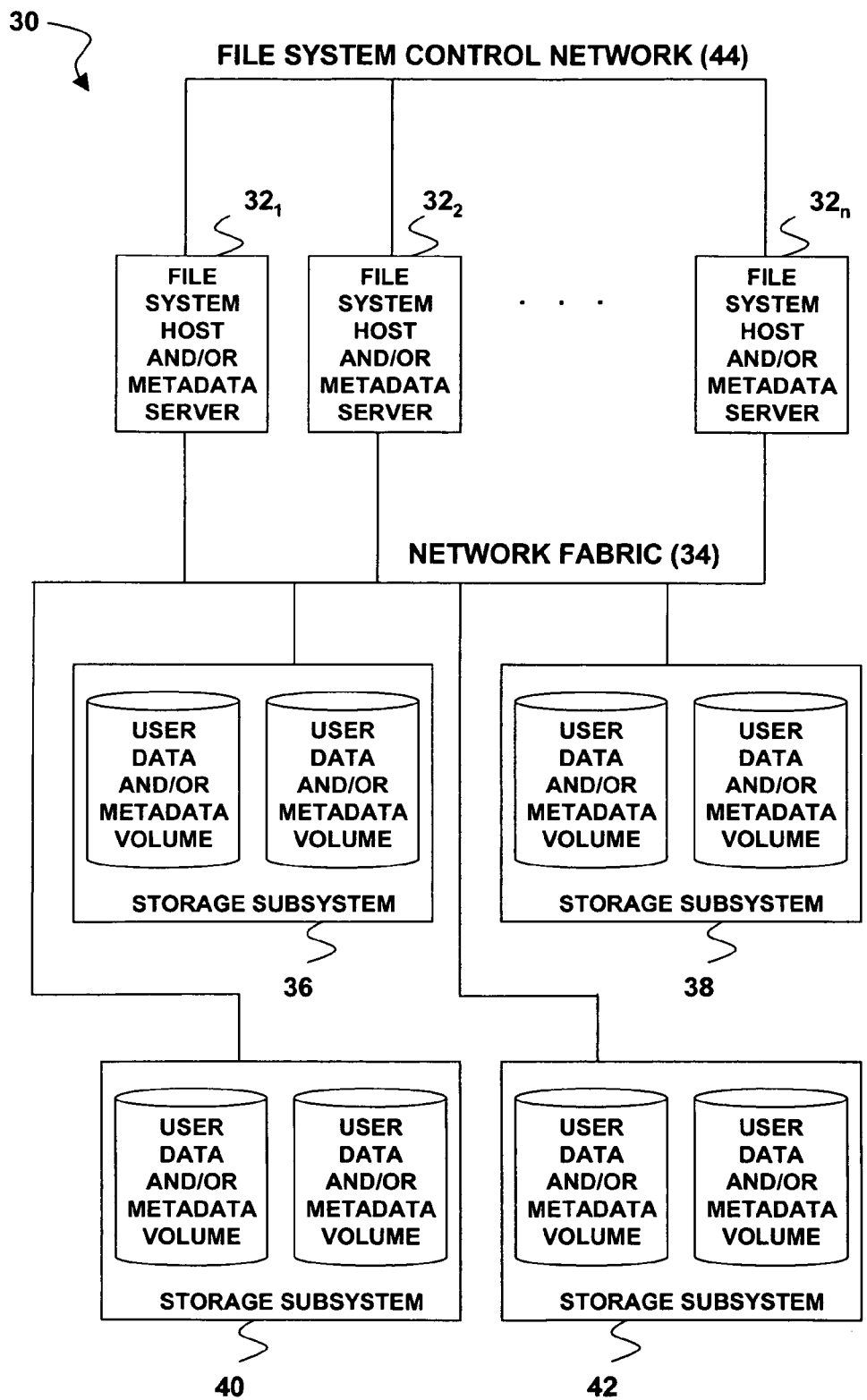
FIG. 7 is an exemplary data storage network in which the present invention may be implemented.

Turning to FIG. 7, an exemplary tiered data storage network 30 according to the present invention is shown that may be used to implement the policy-aware backup and restore techniques described above. The storage network 30 comprises plural storage network hosts $32_1, 32_2 \ldots 32_n$ that are interconnected by way of a network fabric 34 to a set of tiered storage pools comprising (by way of example only) four storage subsystems 36, 38, 40 and 42. The network hosts $32_1, 32_2 \ldots 32_n$ may be data consuming client machines that are end users of the stored data, or they may be storage managers that handle data storage requests from remote data consuming clients that are not connected to the data storage network. Exemplary storage managers include database servers, file servers, application servers, etc. In the context of the present invention, backup and restore applications may execute directly on the network hosts $32_1, 32_2 \ldots 32_n$, or on remote client machines connected to the network hosts. Each storage subsystem 36, 38, 40 and 42 may represent a distinct storage tier in the storage network 30. File metadata may be persisted in each of the storage subsystems 36, 38, 40 and 42, in association with the corresponding files stored on the same subsystem. Alternatively, the file metadata may be stored on a subset of the subsystems 36, 38, 40 and 42, thereby providing dedicated metadata storage.

In addition to their storage network fabric connections, the network hosts $32_1, 32_2 \ldots 32_n$ are also interconnected by way of a file system control network 44 in order to implement a distributed file system in the storage network 30. As is known in the data storage art, the goal of a distributed file system in a storage network environment is to provide such benefits as a global namespace for files regardless of where they are stored, shared access from any network host to any storage device, and centralized, policy-based management. An exemplary commercial product that provides a storage network distributed file system is the IBM® TotalStorage® SAN File System. The IBM® GPFS® (General Parallel File System) File System is another exemplary product.

The storage network 30 may be configured so that the network hosts $32_1, 32_2 \ldots 32_n$ each implement an instance of the distributed file system. In the context of the present invention, this means that each network host $32_1, 32_2 \ldots 32_n$ implements the metadata_backup( ) and metadata_restore_ open( ) system calls, together with the metadata processing and data placement logic.

Alternatively, an out-of-band storage virtualization scheme could be used wherein metadata management is handled by one or more of the network hosts $32_1, 32_2 \ldots 32_n$ (acting as metadata servers), while the remaining network hosts operate as metadata clients. During data access operations in the storage network 30, the metadata servers will process metadata requests from the metadata clients. Thus, when one of the metadata clients needs to transfer file data to or from one of the storage subsystems 26, 30 or 32, it queries one of the metadata servers to determine the file's location, and other control information. Once this information is returned to the metadata client, and it obtains access to the file, the client can perform the required data transfer operation without further intervention by the metadata server. In the context of the present invention, the metadata_backup( ) and metadata_restore_open( ) system calls would be handled jointly by the metadata clients and servers. The metadata processing and data placement logic would be handled by the metadata servers.

Figure 8:
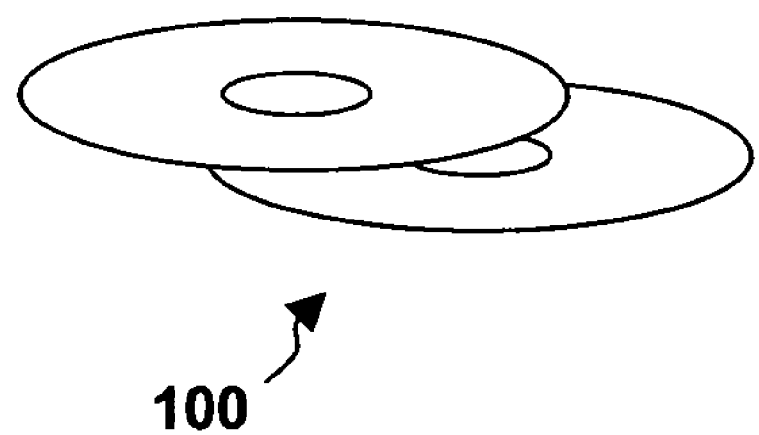
FIG. 8 is a diagrammatic illustration showing physical media that may be used to provide a computer program product for implementing policy-aware backup and restore capability in a tiered storage system in accordance with the invention.

Accordingly, a technique for implementing policy-aware backup and restore capability in a tiered storage system has been disclosed. It will be appreciated that the foregoing concepts may be variously embodied in any of a data processing system, a machine implemented method, and a computer program product in which programming means are provided by one or more machine-readable media for use in controlling a data processing system to perform the required functions. Exemplary machine-readable media for providing such programming means are shown by reference numeral 100 in FIG. 8. The media 100 are shown as being storage media, namely, portable optical storage disks of the type that are conventionally used for commercial software sales, such as compact disk-read only memory (CD-ROM) disks, compact disk-read/write (CD-R/W) disks, and digital versatile disks (DVDs). Such storage media can store the programming means of the invention, either alone or in conjunction with another software product that incorporates the required functionality. The programming means could also be provided by portable magnetic storage media (such as floppy disks, flash memory sticks, etc.), or magnetic storage media combined with drive systems (e.g. disk drives), or storage media incorporated in data processing platforms, such as random access memory (RAM), read-only memory (ROM) or other semiconductor or solid state memory. More broadly, the storage media could comprise any electronic, magnetic, optical, electromagnetic, semiconductor system or apparatus or device, or other storage entity that can be used to contain, store and transport the programming means for use by or in connection with a data processing system, computer or other instruction execution system, apparatus or device. Other media for providing the programming means could also be provided, including an infrared system or apparatus or device, a transmission or propagation signal or signal carrying medium (such as a network), or some other entity that can be used to communicate or propagate the programming means.

Although various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A method for implementing policy-aware backup and restore capability in a tiered storage file system, comprising:

said tiered storage file system managing hierarchical data storage tiers of a tiered storage system wherein the storage tiers represent different classes of storage based on device cost and associated capabilities and include at least one high value storage tier and one low value storage tier, said high value storage tier having higher cost and associated capabilities than said low value storage tier, said high value storage tier storing data of higher data value than said low value storage tier;

said tiered storage file system maintaining Information Lifecycle Management (ILM) metadata for data sets stored in said tiered storage system, said ILM metadata identifying a data set's storage tier assignment;

said storage tier assignment being determined by an ILM policy rule that determines a storage tier where a data set should be placed in said tiered storage system according to a value associated with said data set;

performing a data set backup that backs up a data set independently of said ILM metadata for said data set from said tiered storage file system to a backup storage system to create a backed up data set;

said data set backup including a backup/restore application storing said backed up data set on said backup storage system without use of said ILM metadata for said backed up data set, said backup/restore application acting as a client of said tiered storage file system;

independently performing an ILM metadata backup that backs up said ILM metadata for said backed up data set to create backed up ILM metadata;

said metadata backup including said tiered storage file system providing said ILM metadata for said backed up data set to said backup/restore application as a data object that is opaque to said backup/restore application and said backup/restore application storing said data object as said backed up ILM metadata;

prior to said backed up data set being restored from said backup storage system to said tiered storage file system, said backup/restore application performing an ILM metadata restore that restores said backed up ILM metadata to said tiered storage file system;

said tiered storage file system processing said backed up ILM metadata to determine, based on said data value of data in said backed up data set, a storage tier in said tiered storage system to which said backed up data set will be restored, said storage tier being one of said at least one high value storage tier and one low value storage tier; and said backup/restore application performing a data set restore that restores said backed up data set from said backup storage system to said tiered storage file system, said data set restore being performed in cooperation with said tiered storage file system to place said backed up data set in said storage tier determined by said ILM metadata processing.

2. A method in accordance with claim 1 wherein said ILM metadata comprises standard file metadata.

3. A method in accordance with claim 1 wherein said ILM metadata back up comprises storing said ILM metadata in persistent storage outside of said tiered storage system.

4. A method in accordance with claim 1 wherein said ILM metadata backup comprises storing said ILM metadata as a Binary Large Object (BLOB).

5. A method in accordance with claim 1 wherein said ILM metadata restore includes said backup/restore application transferring said backed up ILM metadata to a memory buffer and issuing a file system call to said tiered storage file system specifying said memory buffer and a file name for restoring said backed up data set to which said backed up ILM metadata corresponds.

6. A method in accordance with claim 5 wherein said data set restore includes said tiered storage file system opening a file having said file name in said storage tier determined by said ILM metadata processing and returning a file descriptor for said file to said backup/restore application.

7. A method in accordance with claim 6 wherein said data set restore further includes said backup/restore application writing data blocks of said backed up data set to said open file and closing said file.

8. A method in accordance with claim 1 wherein said ILM metadata processing comprises applying said ILM policy rule to said ILM metadata to determine said tier for said data set.

9. A method for implementing policy-aware restore operations for backing up and restoring a data set between backup storage and a tiered storage system managed by a tiered storage file system; comprising:

said tiered storage file system managing hierarchical data storage tiers that represent different classes of storage based on device cost and associated capabilities and include at least one high value storage tier and one low value storage tier, said high value storage tier having higher cost and associated capabilities than said low value storage tier, said high value storage tier storing data of higher data value than said low value storage tier;

said tiered storage file system maintaining Information Lifecycle Management (ILM) metadata for data sets stored in said tiered storage system, said ILM metadata identifying a data set's storage tier assignment;

said storage tier assignment being determined by an ILM policy rule that determines a storage tier where a data set should be placed in said tiered storage system according to a value associated with said data set;

performing a data set backup that backs up a data set independently of said ILM metadata for said data set from said tiered storage file system to a backup storage system to create a backed up data set;

said data set backup including a backup/restore application storing said backed up data set on said backup storage system without use of said ILM metadata for said backed up data set, said backup/restore application acting as a client of said tiered storage file system;

independently performing an ILM metadata backup that backs up said ILM metadata for said backed up data set to create backed up ILM metadata;

said ILM metadata backup including said tiered storage file system providing said ILM metadata for said backed up data set to said backup/restore application as a data object that is opaque to said backup/restore application and said backup/restore application storing said data object as said backed up ILM metadata;

prior to said backed up data set being restored from said backup storage system to said tiered storage file system, said backup/restore application performing an ILM metadata restore that restores said backed up ILM metadata to said tiered storage file system; and said tiered storage file system processing said backed up ILM metadata to determine a storage tier in said tiered storage system to which said backed up data set will be restored;

said backup/restore application performing a data set restore that restores said backed up data set from said backup storage system to said tiered storage file system, said data set restore being performed in cooperation with said tiered storage file system to place said backed up data set in said storage tier determined by said ILM metadata processing;

said ILM metadata processing comprising said tiered storage file system evaluating conditions in said tiered storage system and assigning said data set to a storage tier, as by:

performing a first storage tier assignment upon determination that a version of said data set exists on said data set's pre-backup storage tier;

said first storage tier assignment comprising assigning said data set to said pre-backup storage tier;

performing a second storage tier assignment upon determination that a version of said data set exists on a storage tier that is different from said data set's pre-backup storage tier;

said second storage tier assignment comprising assigning said data set to said different storage tier;

performing a third storage tier assignment upon determination that said data set does not exist in said tiered storage system but said data set's pre-backup storage tier exists;

said third storage tier assignment comprising assigning said data set to said data set's pre-backup storage tier unless said pre-backup storage tier has a changed file system identifier, in which case said third storage tier assignment comprises applying policy placement rules to determine a new storage tier target and assigning said data set to said new storage tier target; and performing a fourth storage tier assignment upon determination that said data set and said data set's pre-backup storage tier do not exist in said tiered storage system; and said fourth storage tier assignment comprising applying policy placement rules to determine a new storage tier target and assigning said data set to said new storage tier target.

10. A system, comprising:

one or more processors;

memory coupled to one or more said processors, said memory including one or more computer useable media tangibly embodying one or more programs of instructions executable by said one or more processors to perform operations for implementing policy-aware backup and restore capability in a tiered storage file system, comprising:

said tiered storage system managing hierarchical data storage tiers of a tiered storage system wherein the storage tiers represent different classes of storage based on device cost and associated capabilities and include at least one high value storage tier and one low value storage tier, said high value storage tier having higher cost and associated capabilities than said low value storage tier, said high value storage tier storing data of higher data value than said low value storage tier;

said tiered storage file system maintaining Information Lifecycle Management (ILM) metadata for data sets stored in said tiered storage system, said ILM metadata identifying a data set's storage tier assignment;

said storage tier assignment being determined by an ILM policy rule that determines a storage tier where a data set should be placed in said tiered storage system;

performing a data set backup that backs up a data set independently of said ILM metadata for said data set from said tiered storage file system to a backup storage system to create a backed up data set;

said data set backup including a backup/restore application storing said backed up data set on said backup storage system without use of said ILM metadata for said backed up data set, said backup/restore application acting as a client of said tiered storage file system;

independently performing an ILM metadata backup that backs up said ILM metadata for said backed up data set to create backed up ILM metadata;

said ILM metadata backup including said tiered storage file system providing said ILM metadata for said backed up data set to said backup/restore application as a data object that is opaque to said backup/restore application and said backup/restore application storing said data object as said backed up ILM metadata;

prior to said backed up data set being restored from said backup storage system to said tiered storage file system, said backup/restore application performing an ILM metadata restore that restores said backed up ILM metadata to said tiered storage file system;

said tiered storage file system processing said backed up ILM metadata to determine, based on said data value of data in said backed up data set, a storage tier in said tiered storage system to which said data set will be restored, said storage tier being one of said at least one high value storage tier and one low value storage tier; and said backup/restore application performing a data set restore that restores said backed up data set from said backup storage system to said tiered storage file system, said data set restore being performed in cooperation with said tiered storage file system to place said backed up data set in said storage tier determined by said ILM metadata processing.

11. A system in accordance with claim 10 wherein said ILM metadata restore includes said backup/restore application transferring said backed up ILM metadata to a memory buffer and issuing a file system call to said tiered storage file system specifying said memory buffer and a file name for restoring said backed up data set to which said backed up ILM metadata corresponds.

12. A system in accordance with claim 11 wherein said data set restore includes said tiered storage file system opening a file having said file name in said storage tier determined by said ILM metadata processing and returning a file descriptor for said file to said backup/restore application.

13. A system in accordance with claim 12 wherein said data set restore further includes said backup/restore application writing data blocks of said backed up data set to said open file and closing said file.

14. A system in accordance with claim 10 wherein said ILM metadata processing comprises applying said ILM policy rule to said ILM metadata to determine said tier for said data set.

15. A computer program product, comprising:

one or more machine useable storage media;

logic provided by said one or more storage media for programming one or more processors perform operations for implementing policy-aware backup and restore capability in a tiered storage file system, comprising:

said tiered storage file system managing hierarchical data storage tiers of a tiered storage system wherein the storage tiers represent different classes of storage based on device cost and associated capabilities and include at least one high value storage tier and one low value storage tier, said high value storage tier having higher cost and associated capabilities than said low value storage tier, said high value storage tier storing higher data of higher data value than said low value storage tier, comprising:

said tiered storage file system maintaining Information Lifecycle Management (ILM) metadata for data sets stored in said tiered storage system, said ILM metadata identifying a data set's storage tier assignment;

said storage tier assignment being determined by an ILM policy rule that determines a storage tier where a data set should be placed in said tiered storage system;

performing a data set backup that backs up a data set independently of said ILM metadata for said data set from said tiered storage file system to a backup storage system to create a backed up data set;

said data set backup including a backup/restore application storing said backed up data set on said backup storage system without use of said ILM metadata for said backed up data set, said backup/restore application acting as a client of said tiered storage file system;

independently performing an ILM metadata backup that backs up said ILM metadata for said backed up data set to create backed up ILM metadata;

said ILM metadata backup including said tiered storage file system providing said ILM metadata for said backed up data set to said backup/restore application as a data object that is opaque to said backup/restore application and said backup/restore application storing said data object as said backed up ILM metadata;

prior to said backed up data set being restored from said backup storage system to said tiered storage file system, said backup/restore application performing an ILM metadata restore that restores said backed up ILM metadata to said tiered storage file system;

said tiered storage file system processing said backed up ILM metadata to determine, based on said data value of data in said backed up data set, a storage tier in said tiered storage system to which said backed up data set will be restored, said storage tier being one of said at least one high value storage tier and one low value storage tier; and said storage tier being one of said at least one high value storage tier and one low value storage tier; and said backup/restore application performing a data set restore that restores said backed up data set from said backup storage system to said tiered storage file system, said data set restore being performed in cooperation with said tiered storage file system to place said backed up data set in said storage tier determined by said ILM metadata processing.

16. A computer program product in accordance with claim 15 wherein said ILM metadata restore includes said backup/restore application transferring said backed up ILM metadata to a memory buffer and issuing a file system call to said tiered storage file system specifying said memory buffer and a file name for restoring said backed up data set to which said backed up ILM metadata corresponds.

17. A computer program product in accordance with claim 16 wherein said data set restore includes said tiered storage file system opening a file having said file name in said storage tier determined by said ILM metadata processing and returning a file descriptor for said file to said backup/restore application.

18. A computer program product in accordance with claim 17 wherein said data set restoring further includes said backup/restore application writing data blocks of said backed up data set to said open file and closing said file.

19. A computer program product in accordance with claim 15 wherein said ILM metadata processing comprises applying said ILM policy rule to said ILM metadata to determine said tier for said data set.

* * * * *